United States Patent
Chen et al.

(10) Patent No.: US 9,995,866 B2
(45) Date of Patent: Jun. 12, 2018

(54) UNIFORM ILLUMINATION LIGHTING MODULE

(71) Applicant: Laxco Inc., Bothell, WA (US)

(72) Inventors: Congliang Chen, Bothell, WA (US); Kevin Cassady, Monroe, WA (US)

(73) Assignee: LAXCO INCORPORATED, Bothell, WA (US)

( * ) Notice: Subject to any disclaimer, the term of this patent is extended or adjusted under 35 U.S.C. 154(b) by 29 days.

(21) Appl. No.: 14/601,501

(22) Filed: Jan. 21, 2015

(65) Prior Publication Data
US 2016/0209005 A1   Jul. 21, 2016

(51) Int. Cl.
*G02B 6/00* (2006.01)
*F21V 8/00* (2006.01)
*G02B 17/00* (2006.01)

(52) U.S. Cl.
CPC ........... *G02B 6/002* (2013.01); *G02B 6/0055* (2013.01); *G02B 17/00* (2013.01); *G02B 6/0068* (2013.01); *G02B 6/0073* (2013.01)

(58) Field of Classification Search
CPC .... G02B 6/0023; G02B 6/0031; G02B 6/005; G02B 6/0096; G02B 6/0091
See application file for complete search history.

(56) References Cited

U.S. PATENT DOCUMENTS

| | | | |
|---|---|---|---|
| 5,295,048 A * | 3/1994 | Park .................... | G02B 6/0041 349/65 |
| 5,499,112 A | 3/1996 | Kawai et al. | |
| 6,536,914 B2 * | 3/2003 | Hoelen ................ | G02B 6/0068 362/230 |
| 7,237,938 B2 * | 7/2007 | Wang ................... | G02B 6/0018 362/606 |
| 7,460,196 B2 * | 12/2008 | Kim .................. | G02F 1/133621 349/64 |
| 8,210,700 B2 | 7/2012 | Cho et al. | |
| 8,698,972 B2 * | 4/2014 | Kim ..................... | G02F 1/1333 349/58 |
| 2005/0018147 A1 * | 1/2005 | Lee ...................... | F21V 7/0091 353/98 |

(Continued)

OTHER PUBLICATIONS

3M OneFilm™ Technology Combines Optical Functionality of Three Light Management Films into a Single Film, Jun. 5, 2012; St. Paul, Minn.

(Continued)

*Primary Examiner* — Julie Bannan
(74) *Attorney, Agent, or Firm* — Lee & Hayes, PLLC

(57) ABSTRACT

A uniform illumination lighting module is disclosed herein. In some embodiments, the uniform illumination lighting module comprises a first optical medium, a lower reflective surface disposed adjacent to a bottom boundary of the first optical medium, a concave reflective surface disposed adjacent to a side boundary of the first optical medium, and a light source, wherein at least a portion of the first optical medium is disposed between the light source and the concave reflective surface. In some embodiments, the uniform illumination lighting module further comprises a second optical medium disposed adjacent to a top boundary of the first optical medium. In preferred embodiments, the concave reflective surface is substantially parabolic and the light source is disposed at a parabolic focus of the concave reflective surface.

20 Claims, 3 Drawing Sheets

(56) References Cited

U.S. PATENT DOCUMENTS

| | | | |
|---|---|---|---|
| 2006/0002141 A1* | 1/2006 | Ouderkirk | G02B 6/0001 362/609 |
| 2006/0181901 A1* | 8/2006 | Sakai | G02B 6/0096 362/613 |
| 2006/0256578 A1* | 11/2006 | Yang | G02F 1/133615 362/609 |
| 2007/0014126 A1* | 1/2007 | Kuo | G02B 6/0018 362/600 |
| 2007/0081329 A1* | 4/2007 | Chua | B82Y 20/00 362/231 |
| 2007/0091641 A1* | 4/2007 | Lin | G02B 6/0031 362/615 |
| 2008/0025045 A1* | 1/2008 | Mii | G02B 6/0026 362/611 |
| 2010/0172152 A1* | 7/2010 | Boonekamp | F21V 7/0008 362/609 |
| 2011/0216554 A1* | 9/2011 | Hattori | F21V 7/22 362/606 |
| 2012/0001095 A1 | 1/2012 | Yan et al. | |
| 2013/0058126 A1* | 3/2013 | Kim | G09F 3/14 362/602 |
| 2013/0271699 A1* | 10/2013 | Chen | G02B 6/0083 349/62 |
| 2014/0043852 A1* | 2/2014 | Zeng | F21V 7/00 362/609 |
| 2015/0002786 A1* | 1/2015 | Huang | G02F 1/133553 349/65 |
| 2015/0185395 A1* | 7/2015 | Chang | G02B 6/0031 362/606 |

OTHER PUBLICATIONS

3M Optical Systems Division, 3M Air Guide Value Proposition, 2011, St. Paul, MN.

Hitachi, LCD Backlighting Technologies and Configurations, Sep. 2004.

\* cited by examiner

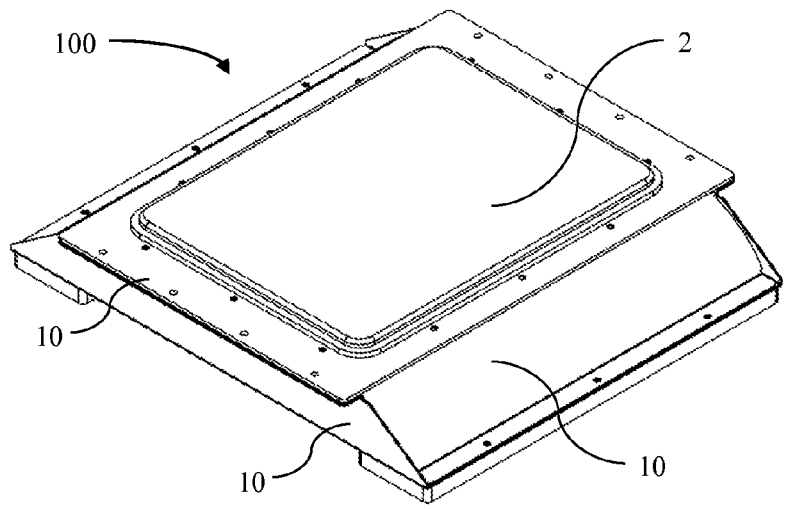
FIG. 1
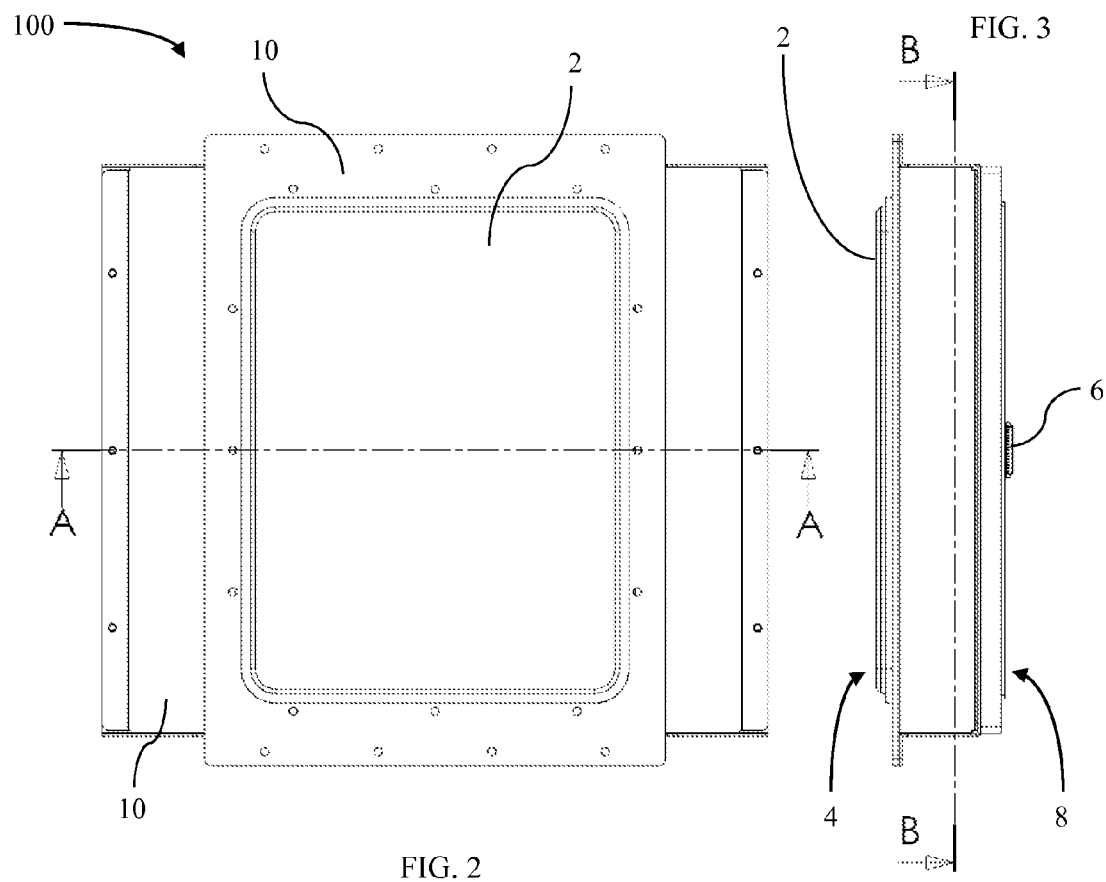
FIG. 2
FIG. 3

UNIFORM ILLUMINATION LIGHTING MODULE

FIELD OF THE DISCLOSURE

The present disclosure relates generally to the field of lighting systems and, more particularly, to an edge-lighted lighting module which produces lighting of highly uniform luminous intensity over a lighted transmittance area.

BACKGROUND

This section provides background information related to the present disclosure which is not necessarily prior art.

Lighting modules are used in a variety of applications and for a variety of purposes, in most of which production of a highly uniform light source, e.g. uniform intensity throughout a particular transmittance area, is generally desirable. However, due to the engineering limitations such as available lighting sources and packaging considerations of lighting modules, a common issue is lack of uniformity of the light emitted from the lighting module. For example, many lighting modules utilize a series of light sources spaced apart by various distances in order to approximate a uniform light source; however, as the individual light sources are spaced further apart from one another the uniformity of light decreases and light spots (or hot spots) characterized by higher luminous intensity result. Such light spots are typically undesirable. This issue and attempts to resolve it are described in U.S. Pat. No. 5,499,112 to Kawai et al., dated Mar. 12, 1996, which graphically illustrates the variation of luminous intensity in relation to the spacing of lighting sources as well as an attempt to reduce this phenomenon.

One such application wherein light spots are undesirable is that of fluorescence photography and, in particular, western blotting. Western blotting was introduced in 1979 and is now a routine technique for protein analysis. Utilizing this technique, the specificity of the antibody-antigen interaction enables a target protein to be identified within a more complex protein mixture. In particular, based on known characteristics of a biomolecule of interest, different enzymes or fluorescent dyes are used to label the biomolecule of interest. Once labeled various methods of observation are utilized. For example, in DNA fluorescence image observation, a 465 nm blue LED-based backlight is used to excite the labeled DNA sample to fluoresce and a CCD camera is used for observation or photography. However, variations in luminous intensity of the blue light, e.g. light spots, can interfere with observation or photography.

Attempts to resolve the issue of light spots in fluorescence photography include utilizing light diffusers for diffusing light spots into a more uniform light of a larger area. However, while the utilization of light diffusers alone may reduce the appearance and noticeability of light spots produced by direct-type backlight modules, e.g. a backlight module wherein light travels directly from a light source at the back of the module to the transmittance area, in highly light sensitive applications the appearance of light spots persists. Further attempts include dispersing light from a light source in edge-type backlight modules, for example, by utilizing an LED array to irradiate light diagonally to a light transmission zone for preventing formation of light spots.

The various attempts at improving the uniformity of the luminous intensity of a light emitted from a lighting module are workable in some applications. However, some of the attempts are limited in increasing uniformity due to requiring an increase in light sources to further increase uniformity of light. Moreover, even the strategic placement of light diffusers between the light sources and the light transmission zone does not completely alleviate the appearance of light spots. Other attempts are limited in increasing uniformity due to a concentration of light, e.g. formation of light spots, at the edges of the transmission zone near the sources of light.

SUMMARY

This section provides a general summary of the disclosure, and it is not a comprehensive disclosure of its full scope or all of its features.

A uniform illumination lighting module is disclosed herein. In some embodiments, the uniform illumination lighting module comprises a first optical medium, a lower reflective surface disposed adjacent to a bottom boundary of the first optical medium, a concave reflective surface disposed adjacent to a side boundary of the first optical medium, and a light source, wherein at least a portion of the first optical medium is disposed between the light source and the concave reflective surface. In some embodiments, the uniform illumination lighting module further comprises a second optical medium disposed adjacent to a top boundary of the first optical medium. In preferred embodiments, the concave reflective surface is substantially parabolic and the light source is disposed at a parabolic focus of the concave reflective surface.

The following embodiments and descriptions are for illustrative purposes only and are not intended to limit the scope of the uniform illumination lighting module. Other aspects and advantages of the present invention will become apparent from the following detailed description.

BRIEF DESCRIPTION OF THE DRAWINGS

These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

FIG. 1 is a perspective view of a uniform illumination lighting module in accordance with an embodiment of the present disclosure.

FIG. 2 and FIG. 3 show a top view and a side view, respectively, of the uniform illumination lighting module of FIG. 1.

DETAILED DESCRIPTION

Figure 4:
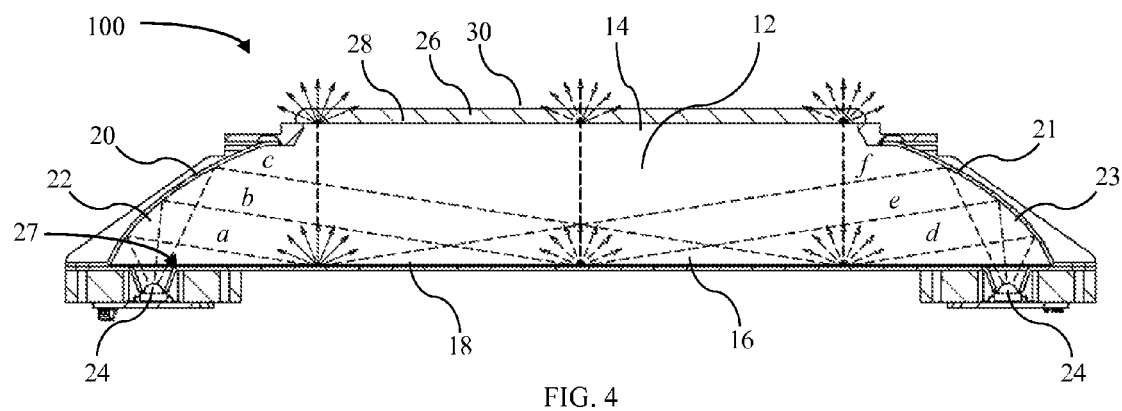
FIG. 4 shows a cross-sectional view of the uniform illumination lighting module of FIG. 2 taken along the line A-A of FIG. 2.

Following is a description by way of example only and with reference to the accompanying drawings of a manner of constructing and using the uniform illumination lighting module. Example embodiments are provided to fully convey the scope of this disclosure to those skilled in the art. The presently disclosed uniform illumination lighting module may have additional embodiments, may be practiced without one or more of the details described for any particular described embodiment, or may have any detail described for one particular embodiment practiced with any other detail described for another embodiment. Numerous specific details are set forth as examples and are intended to provide a thorough understanding of embodiments of the present disclosure. It will be apparent to one skilled in the art that these specific details need not be employed, that example embodiments may be embodied in many different forms, and that neither should be construed to limit the scope of the disclosure. In some example embodiments, well-known processes, well-known device structures, and well-known technologies are not described in detail. Moreover, the method steps, processes, and operations described herein are not to be construed as necessarily requiring their performance in any particular order discussed or illustrated, unless specifically identified as an order of performance. It is also to be understood that additional or alternative steps may be employed.

Referring now to the drawings, FIG. 1 shows a perspective view of a uniform illumination lighting module 100 in accordance with an embodiment of the present disclosure. FIG. 2 and FIG. 3 show a top view and a side view, respectively, of the uniform illumination lighting module of FIG. 1. In preferred embodiments, the uniform illumination lighting module 100 includes a transmittance area 2 disposed at a top end 4 as well as an electrical connector 6 disposed at a bottom end 8. Preferably, the electrical connector 6 accepts at least one of an input signal and an electrical current for controlling one or more internal light sources. Furthermore, the uniform illumination lighting module 100 may also include one or more structural housing elements 10 for supporting the various optical components necessary to construct and implement the presently disclosed uniform illumination lighting module 100, e.g. various optical mediums and reflective surfaces as discussed infra. It should be appreciated that the one or more structural housing elements 10 may be implemented in many ways and may take many forms or geometrical shapes without departing from the scope of the present disclosure. It should further be appreciated that some embodiments of the presently disclosed uniform illumination lighting module 100 may be implemented without the use of dedicated structural housing elements, e.g. the optical components described in detail infra may also serve structural support functions.

Referring now particularly to FIG. 4, a cross-sectional view of the uniform illumination lighting module 100 of FIG. 2 taken along the line A-A of FIG. 2 is shown. As shown in FIG. 4, the uniform illumination lighting module 100 includes a first optical medium 12, which further includes a top boundary 14 and a bottom boundary 16, a lower reflective surface 18 which is disposed adjacent to the bottom boundary 16 of the first optical medium 12, at least one concave reflective surface 20, 21 disposed adjacent to one or more side boundaries 22, 23 of the first optical medium 12, a light source 24, and a second optical medium 26 disposed adjacent to the top boundary 14 of the first optical medium 12. In some embodiments, the second optical medium 26 includes a lower boundary 28 and an upper boundary 30. As shown in FIG. 4, at least a portion of the first optical medium 12 is disposed between the light source 24 and the at least one concave reflective surface 20, 21. In some embodiments, the first optical medium 12 is comprised simply of the surrounding atmospheric gas, e.g. air. It should be appreciated that the first optical medium 12 and the second optical medium 26 may be comprised of any material through which electromagnetic waves may propagate. For example, each of air and transparent glass are aptly described as an optical medium because each material allows electromagnetic waves, e.g. visible light, to propagate through the material. In a preferred embodiment, the first optical medium 12, or the second optical medium 26, or both are comprised of quartz transparent glass or sapphire transparent glass due to the transparency to a broad range of wavelengths exhibited by these materials. It should be further appreciated that the lower reflective surface 18 and the at least one concave reflective surface 20, 21 may be comprised of any material capable of reflecting any portion of the spectrum of electromagnetic waves including but not limited to visible light. For example, each of a mirrored surface and a matte white painted surface are aptly described as a reflective surface because each surface will reflect at least a portion of the spectrum of electromagnetic radiation (even if another portion of the spectrum is absorbed by the surface).

Still referring to FIG. 4, this cross-sectional view of the uniform illumination lighting module is particularly helpful in gaining an understanding of the present disclosure due to the depiction of several typical light paths propagating from the light source 24 toward the at least one concave reflective surface 20, 21 and ultimately through the second optical medium thereby illuminating the transmittance area 2 with highly uniform luminous intensity. In particular, six separate light paths are depicted in FIG. 4 as dashed lines and are labeled as light path a through light path f. Referring in particular to light path a, as light is generated from the light source 24 rays of light propagate along light path a toward concave reflective surface 20 which then reflects the rays of light toward the lower reflective surface 18. In some embodiments, concave reflective surfaces 20 and 21 are configured to perform substantially specular reflection of rays of light (or any other form of electromagnetic wave), e.g. mirror-like reflection of electromagnetic waves such that a single incoming direction (ray) is reflected into a single outgoing direction. In some embodiments, lower reflective surface 18 is configured to perform diffuse reflection of rays of light (or any other form of electromagnetic wave), e.g. a single incoming direction (ray) is reflected at many angles. In a preferred embodiment, the lower reflective surface 18 is configured to perform substantially ideal diffuse reflection, e.g. the diffuse reflected light rays have generally equal luminance from all reflected directions. In the illustrated embodiment, the concave reflective surfaces 20, 21 are configured to perform substantially specular reflection as indicated by the light paths a-f propagating in a single incoming direction and a single outgoing direction whereas the lower reflective surface 18 is configured to perform substantially ideal diffuse reflection as indicated by the scattered arrowhead directions indicating diffusely reflected light rays (or diffusely transmitted rays elsewhere in the illustrations).

In some embodiments, the at least one concave reflective surface 20, 21 is substantially parabolic in curvature shape (as represented in the cross-section of line A-A) and, accordingly, includes a parabolic focus and a collimated light direction. It should be appreciated that the reflective property of a parabola holds that light which enters a parabola travelling parallel to the axis of symmetry of the parabola will be reflected to the parabolic focus, e.g. assuming specular reflection. It should be similarly appreciated that light emitted from the parabolic focus will be reflected off the parabolic surface parallel to the axis of symmetry. Accordingly, the collimated light direction of the substantially parabolic concave reflective surface is parallel to the axis of symmetry of the same. Moreover, it should further be appreciated that although the substantially parabolic concave reflective surfaces 20, 21 represents only a selected portion of a full mathematical parabolic curve, each surface still has an axis of symmetry which passes through the vertex of each respective surface's full mathematical parabolic curve such that rays of light emitted from the parabolic focus are reflected off the substantially parabolic reflective surfaces 20, 21 in a single direction which is parallel to the respective axis of symmetry of each of surfaces 20, 21. In a preferred embodiment, the light source 24 is disposed at the parabolic focus of one or both of the substantially parabolic concave reflective surfaces 20, 21 so that light emitted from the light source is reflected by surfaces 20, 21 in a collimated light direction toward the lower reflective surface. The collimated light direction of concave reflective surface 20 is that of light paths a, b, and c whereas the collimated light direction of concave reflective surface 21 is that of light paths d, e, and f. For example, in the illustrated embodiment each of light paths a-c are parallel to one another in the section between the lower reflective surface 18 and the concave reflective surface 20 and each of light paths d-f are parallel to one another in the section between the lower reflective surface 18 and the concave reflective surface 21. It should be appreciated that the parabolic focus is not limited to a singular point but rather may be comprised of one or more lines and/or curves. For example, in the embodiment illustrated in FIGS. 1-5 the substantially parabolic concave reflective surfaces 20 and 21 are linear extrusions of a parabolic profile, e.g. surfaces 20 and 21 have fixed cross-sectional profiles such that the parabolic focus is represented by a straight line. In other embodiments, the uniform illumination lighting module may comprise a concave reflective surface which is represented by a substantially parabolic profile revolved about an axis. In such embodiments, the parabolic focus is represented by a planar circular line.

In some embodiments, the at least one concave reflective surface 20, 21 is configured to produce light of uniform luminous intensity upon the lower reflective surface 18 upon reflection of light emitted from the light source 24. In particular, it should be appreciated that the luminous intensity of light reflected outwards from a parabola from a point source at the parabolic focus is not necessarily constant as the distance from the axis of symmetry increases. For example, the luminous intensity of the reflected light is typically the greatest near the axis of symmetry of the parabola. Accordingly, in some embodiments of the uniform illumination lighting module 100 one or both of the concave reflective surfaces 20, 21 are optimally shaped such that the luminous intensity of light emitted from the light source 24 and reflected by concave reflective surfaces 20 or 21 is substantially uniform across the entire area of the lower reflective surface 18. For example, one or both of the concave reflective surfaces 20, 21 are shaped to produce convergent beams of light wherein the luminous intensity of the convergent beams are substantially uniform at the plane defined by lower reflective surface 18. It should be appreciated that the specific shape required to produce such uniform luminous intensity will vary depending on the geometrical configuration of the various components of the uniform illumination lighting module 100 and that determination and may be determined utilizing modern illumination system design software such as OpticStudio™ produced by Zemax™, LLC.

Figure 5:
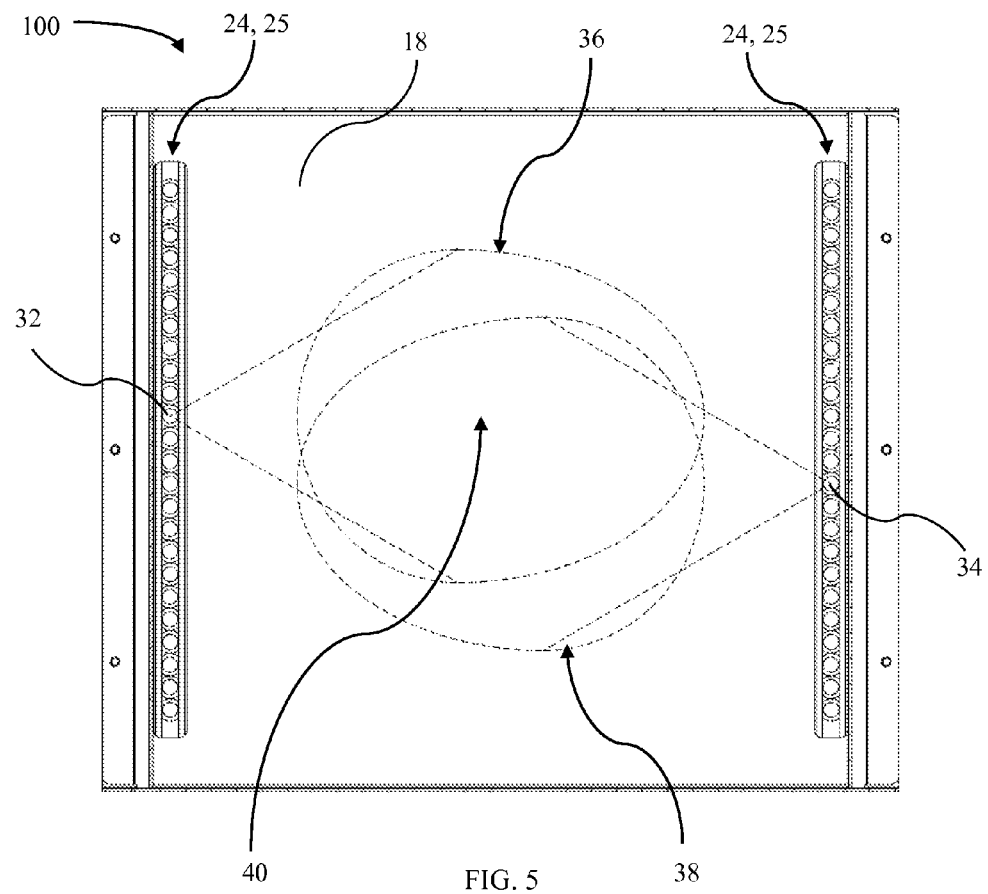
FIG. 5 shows a cross-sectional view of the uniform illumination lighting module of FIG. 3 taken along the line B-B of FIG. 3.

Referring now to FIG. 5, a cross-sectional view of the uniform illumination lighting module of FIG. 3 taken along the line B-B of FIG. 3 is shown. As shown in FIG. 5, the light source 24 may be comprised of one or more arrays of light emitting diodes (LED) 25. In a preferred embodiment, the light source 24 is comprised of two arrays of dimmable LEDs thereby allowing for the overall luminous intensity emitted at transmittance area 2 to be actively controlled, e.g. by selectively modifying an input at electrical connector 6. In some embodiments, the light source 24 is comprised of one or more fluorescent tube lights (not depicted), e.g. a cold cathode fluorescent lamp (CCFL). As can be seen from FIG. 5, light emitted from a single LED light 32, 34 among the array of LEDs 25 is projected upon a relatively large area 36, 38 (respectively) of the lower reflective surface 18. Reflection of light emitted from a single point, e.g. LEDs 32 and 34, to a large area, e.g. areas 36 and 38, furthers the objective of evenly distributing emitted light across the transmittance area 2 to produce transmitted light of a highly uniform luminous intensity. In particular, as light emitted from a single point such as the single LED 32 of the array of LEDs 25 is projected upon the large area 36 of the lower reflective surface 18 at least some of this emitted light propagates toward, and ultimately through, the second optical medium 26 within a larger area than it otherwise would if the single LED were located at a center 40 of area 36 (assuming a roughly equal height of the uniform illumination lighting module 100, e.g. assuming the LED is not located at further from the second optical medium thereby allowing emitted light to spread over a larger area). Moreover and referring back to FIG. 4, in some embodiments, the light source 24 is recessed in such a manner that no direct path exists between the light source 24 and the transmittance area 2. For example, as can be seen in FIG. 4 light path c only slightly passes by recess corner 27 such that light paths rotated clockwise (about light source 24) will eventually strike the recess corner 27 and will not pass directly to the top boundary 14, second optical medium 26, or transmittance area 2. Accordingly, in some embodiments, light spots are not created around the edges of transmittance area 2 because light emitted from light source 24 is dispersed across the entire area of lower reflective surface 18 prior to passing through transmittance area 2.

In some embodiments, the lower boundary 28 of the second optical medium 26 is configured to perform diffuse transmission of electromagnetic waves, e.g. a single incoming direction (ray) is transmitted at many angles. For example, the lower boundary 28 may be configured to perform diffuse transmission of electromagnetic waves by creating a rough surface of the second optical medium 26 at the lower boundary 28, e.g. the second optical medium 26 may be quartz transparent glass with a sandblasted surface and/or frosted surface at lower boundary 28. Furthermore, as another example, the lower boundary 28 may be configured to perform diffuse transmission of electromagnetic waves by the addition of a diffuser film at the lower boundary 28.

In some embodiments, the uniform illumination lighting module 100 is configured to emit electromagnetic waves of one or more specific wavelengths or ranges of wavelengths. For example, in some embodiments the light source 24 is comprised of one or more light emitting diodes (LED) configured to emit pure white light, e.g. electromagnetic radiation within the wavelength range of 380 nm to 740 nm, whereas in other embodiments the light source 24 is comprised of one or more LEDs configured to emit only blue light, e.g. electromagnetic radiation within the wavelength range of 435 nm to 500 nm. In other embodiments, the uniform illumination lighting module 100 includes one or more filters to allow electromagnetic waves of only certain wavelengths to path, e.g. optical filter elements may be used to selectively transmit light of different wavelengths. In some embodiments, one or more filters may be disposed adjacent to one or more of the bottom boundary 16, top boundary 14, upper boundary 30, the lower boundary 28, or one or more of the concave reflective surfaces 20, 21, or any combination thereof. Furthermore, in some embodiments one or more of the first optical medium 12 and the second optical medium 26 are comprised of optical material configured to selectively transmit electromagnetic radiation of a predetermined wavelength or wavelength range, e.g. the second optical medium 26 may be comprised of a material configured to transmit only electromagnetic radiation within the wavelength range of 435 nm to 500 nm (e.g. blue visible light).

In some embodiments, the first optical medium 12 has a first refractive index and the second optical medium 26 has a second refractive index. It should be appreciated that a refractive index is a property of an optical medium which describes how electromagnetic radiation propagates through that medium. As such the first and second refractive indexes are not specifically labelled in the figures. In some embodiments, the first optical medium 12 and second optical medium 26 are selected from various materials such that the first refractive index is greater than the second refractive index. In such embodiments, electromagnetic waves that strike a medium boundary between the first optical medium 12 and the second optical medium 26, e.g. the top boundary of the 14 of the first optical medium and/or the lower boundary 28 of the second optical medium 26, at an angle larger than a particular critical angle will experience total internal reflection and the waves will continue to propagate internal to the uniform illumination lighting module 100 until the waves are either absorbed by one or more internal components or are reflected until striking the aforementioned boundary at an angle of incidence less than the critical angle. In some embodiments, the second optical medium 26 is selected from materials such that the second refractive index is greater than the refractive index of atmospheric air. In such embodiments, electromagnetic waves that strike a medium boundary between the second optical medium 26 and the atmosphere (e.g. air surrounding the uniform illumination lighting module 100), e.g. the upper boundary 30 of the second optical medium 26, at an angle larger than a particular critical angle will experience total internal reflection and may propagate back into the first optical medium and either be absorbed or reflected until the waves strikes upper boundary 30 at an angle less than the critical angle. It should be appreciated that in embodiments of the uniform illumination lighting module 100 which comprise one or more internal diffusing elements, e.g. embodiments wherein the lower reflective surface 18 is configured to perform diffuse reflection, waves which have undergone total internal reflection at one or more medium boundaries may be further diffused within the uniform illumination lighting module 100 which further increases the overall uniformity of luminous intensity of electromagnetic waves propagating through transmittance area 2.

Figure 6:
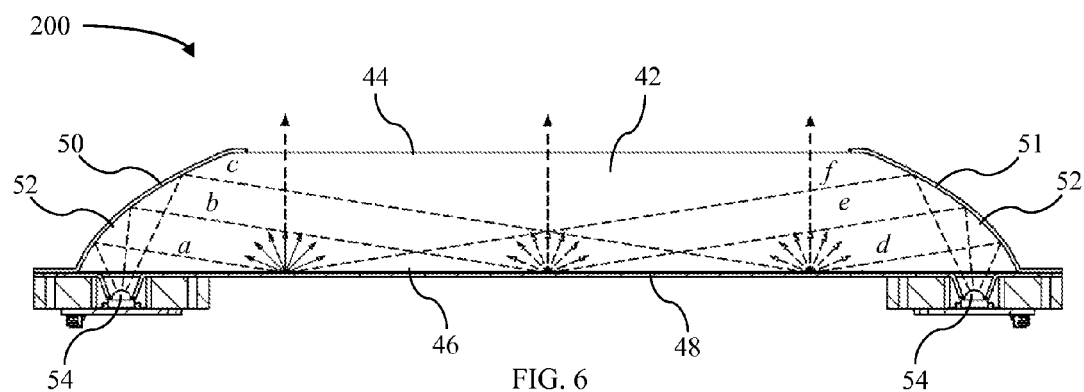
FIG. 6 shows a cross-sectional view similar to FIG. 4 in accordance with a first alternate embodiment of a uniform illumination lighting module.
Figure 7:
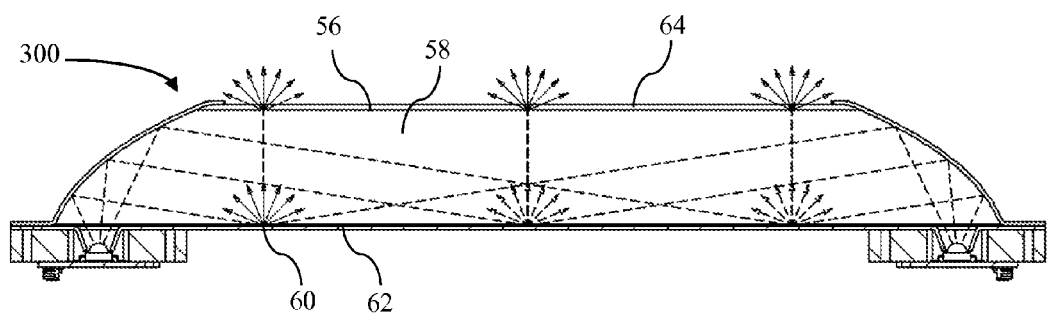
FIG. 7 shows a cross-sectional view similar to FIG. 4 in accordance with a second alternate embodiment of a uniform illumination lighting module.

Referring now particularly to FIG. 6, a cross-sectional view similar to FIG. 4 in accordance with a first alternate embodiment of a uniform illumination lighting module 200 is shown. As shown in FIG. 6, the uniform illumination lighting module 200 includes an optical medium 42, which further includes a top boundary 44 and a bottom boundary 46, a lower reflective surface 48 which is disposed adjacent to the bottom boundary 46 of the first optical medium 42, at least one concave reflective surface 50, 51 disposed adjacent to one or more side boundaries 52 of the optical medium 42, and a light source 54. As shown in FIG. 6, at least a portion of the optical medium 42 is disposed between the light source 54 and the at least one concave reflective surface 50, 51. In some embodiments, the optical medium 12 is comprised of quartz transparent glass or sapphire transparent glass. It should be appreciated that the optical medium 42 may be comprised of any material through which electromagnetic waves may propagate. It should be further appreciated that any details described in relation to embodiment 100 are within the scope of embodiment 200. For example, concave reflective surfaces 50 and/or 51 may be substantially parabolic and the light source 54 may be disposed at a parabolic focus. Still referring to FIG. 6, six separate light paths are depicted as dashed lines and are labeled as light path a through light path f. Referring in particular to light path a, as light is generated from the light source 54 rays of light propagate along light path a toward concave reflective surface 50 which then reflects the rays of light toward the lower reflective surface 48. In the illustrated embodiment, the concave reflective surfaces 50, 51 are configured to perform substantially specular reflection as indicated by the light paths a-f propagating in a single incoming direction and a single outgoing direction whereas the lower reflective surface 48 is configured to perform substantially ideal diffuse reflection as indicated by the scattered arrowhead directions indicating diffusely reflected light rays. In some embodiments, such as embodiment 200, the top boundary 44 of the optical medium 42 is configured to perform direct transmission of electromagnetic waves, e.g. waves striking the top boundary 44 perpendicular to the top boundary 44 will propagate through the atmospheric medium perpendicular to the top boundary 44 whereas waves striking the top boundary 44 at a non-perpendicular angle will be refracted or internally reflected dependent on the angle of incidence and refractive indexes of mediums. In some embodiments, the top boundary 44 is polished to improve the direct transmissive property of the surface. Referring now particularly to FIG. 7, a cross-sectional view similar to FIG. 6 in accordance with second alternate embodiment of a uniform illumination lighting module 300 is shown. Embodiment 300 is similar to embodiment 200 in many respects but is configured to perform diffuse transmission of electromagnetic waves at a top boundary 56 of an optical medium 58 and diffuse reflection at a lower reflective surface 60 adjacent to a bottom boundary 62 of the optical medium 58. In some embodiments, the uniform illumination lighting module 300 is configured to perform diffuse transmission at the top boundary 56 by roughing and/or coating a top surface of the optical medium 58. Furthermore, in some embodiments, the uniform illumination lighting module 300 is configured to perform diffuse transmission at the top boundary 56 by further including at least one diffusing element 64 adjacent to the top boundary 56.

The foregoing description details certain implementations of the uniform illumination lighting module disclosed herein. It will be appreciated, however, that no matter how detailed the foregoing appears in text, the systems, devices, and methods may be practiced in many ways. It should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the implementations. It will also be appreciated by those of skill in the art that parts included in one implementation are interchangeable with other implementations; one or more parts from a depicted implementation may be included with other depicted implementations in any combination. For example, any of the various components described herein and/or depicted in the Figures may be combined, interchanged or excluded from other implementations.

Insofar as the description above and the accompanying drawing disclose any additional subject matter that is not within the scope of the claim(s) below, the inventions are not dedicated to the public and the right to file one or more applications to claim such additional inventions is reserved. It is intended that any such material will be claimed in one or more applications which claim the benefit of priority from this application.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The terms "generally," "substantially," or other terms of degree may be utilized herein to represent the inherent degree of uncertainty that may be attributed to any quantitative comparison, value, measurement, or other representation. One skilled in the art will recognize that in manufacturing any tangible apparatus there may be predetermined tolerance specifications defining the allowable variation from nominal dimensions. For example, a surface may be considered configured to perform substantially specular reflection when the surface reflects light as specularly as a commercially available mirror. The terms are also used herein to represent the degree by which a quantitative representation may vary from a stated reference without resulting in a change in the basic function of the apparatus.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and implementations of the present development. This development is susceptible to modifications in the methods and implementations, as well as alterations in the fabrication methods and equipment. Such modifications will become apparent to those skilled in the art from a consideration of this disclosure or practice of the development disclosed herein. Consequently, it is not intended that this development be limited to the specific implementations disclosed herein, but that it cover all modifications and alternatives coming within the true scope and spirit of the development as embodied in the attached claims.

What is claimed is:

1. A uniform illumination lighting module, comprising:
an optical medium having a first refractive index, the optical medium being bounded by a reflective lower surface, a top boundary, and one or more side boundaries;
a recess formed in the reflective lower surface adjacent an edge of the reflective lower surface;
at least one light source disposed within the recess;
at least one concave reflective surface disposed adjacent to at least one of the one or more side boundaries, wherein the at least one concave reflective surface is a substantially concave reflective surface comprising a parabolic focus and a collimated light direction; and
wherein the at least one light source is positioned within the recess to emit light onto the at least one concave reflective surface, the recess configured to block a straight line path between the at least one light source and the top boundary such that all of the light that reaches the top boundary is (i) reflected by the at least one concave reflective surface downwardly towards the reflective lower surface, and (ii) reflected by the reflective lower surface towards the top boundary.

2. The uniform illumination lighting module of claim 1, wherein the optical medium comprises at least one of an at least partially transparent gas, or an at least partially transparent solid material.

3. The uniform illumination lighting module of claim 1, wherein the at least one light source is generally disposed at the parabolic focus of the at least one concave reflective surface and wherein the collimated light direction of the at least one concave reflective surface is directed toward the lower reflective surface.

4. The uniform illumination lighting module of claim 1, wherein the lower reflective surface is a diffuse reflective surface, the reflective lower surface of the optical medium is a diffuse transmissive surface, or the top boundary of the optical medium is a diffuse transmissive surface, or any combination thereof.

5. The uniform illumination lighting module of claim 1, wherein the at least one light source comprises one or more arrays of dimmable light-emitting diodes, or one or more fluorescent lights, or both.

6. The uniform illumination lighting module of claim 1, comprising two concave reflective surfaces, the two concave reflective surfaces being disposed adjacent to opposing side boundaries of the optical medium.

7. A uniform illumination lighting module, comprising:
a first optical medium having a first refractive index, the first optical medium being bounded by a substantially planar lower reflective surface, a top boundary, and one or more side boundaries;
at least one concave reflective surface disposed adjacent to at least one of the one or more side boundaries, wherein the at least one concave reflective surface includes a substantially parabolic profile, the at least one concave reflective surface having a parabolic focus and a collimated light direction;
at least one light source to emit light onto the at least one concave reflective surface; and
a second optical medium having a second refractive index, the second optical medium forming the top boundary, wherein substantially no linear light path exists between the at least one light source and the second optical medium such that all of the light that reaches the second optical medium is (i) reflected by the at least one concave reflective surface downwardly towards the substantially planar lower reflective surface, and (ii) reflected by the lower surface reflective surface towards the lower boundary of the second optical medium.

8. The uniform illumination lighting module of claim 7, wherein the second optical medium having a second refractive index comprises an at least partially transparent solid material selected from the group consisting of: quartz transparent glass, and sapphire transparent glass.

9. The uniform illumination lighting module of claim 8, wherein the first optical medium having a first refractive index comprises an at least partially transparent gas.

10. The uniform illumination lighting module of claim 7, wherein the second refractive index of the second optical medium is greater than the first refractive index of the first optical medium.

11. The uniform illumination lighting module of claim 7, wherein the at least one light source is generally disposed at the parabolic focus of the at least one concave reflective surface and wherein the collimated light direction of the substantially parabolic concave reflective surface is directed toward the substantially planar lower reflective surface.

12. The uniform illumination lighting module of claim 7, wherein the substantially planar lower reflective surface is a diffuse reflective surface, the top boundary is a diffuse transmissive surface, the second optical medium has a diffuse transmissive surface, or the upper boundary of the second optical medium is a direct transmissive surface, or any combination thereof.

13. The uniform illumination lighting module of claim 7, wherein the at least one light source comprises one or more arrays of dimmable light-emitting diodes, or one or more fluorescent lights, or both.

14. The uniform illumination lighting module of claim 7, comprising two concave reflective surfaces, the two concave reflective surfaces being disposed adjacent to opposing side boundaries of the first optical medium.

15. A uniform illumination lighting module, comprising:
a lower reflective surface, an upper transmissive surface, and side boundaries extending therebetween;
a recess formed in the lower reflective surface;
a light source disposed within the recess such that the light source is below the lower reflective surface;
at least one concave reflective surface disposed adjacent to at least one of the one or more side boundaries, wherein the concave reflective surface is parabolic and the light source is disposed at a parabolic focus of the reflective surface; and
wherein light emitted from the light source reflects off the concave reflective surface downwardly toward the lower reflective surface and is reflected by the lower reflective surface upwardly to the upper transmissive surface.

16. The uniform illumination lighting module of claim 15, wherein the lower reflective surface is a diffuse reflective surface.

17. The uniform illumination lighting module of claim 15, wherein the light source is positioned within the recess such that the recess blocks a straight line path from the light source to the upper transmissive surface.

18. The uniform illumination lighting module of claim 15, wherein the lower reflective surface is a diffuse reflective surface or the upper transmissive surface is a diffuse transmissive surface, or any combination thereof.

19. The uniform illumination lighting module of claim 15, wherein the light source comprises one or more arrays of dimmable light-emitting diodes.

20. The uniform illumination lighting module of claim 15, wherein the concave reflective surface is a first concave reflective surface, and further comprising a second concave reflective surfaces, the first and second concave reflective surfaces being disposed adjacent to opposing side boundaries.

\* \* \* \* \*